United States Patent [19]
Joto

[11] Patent Number: 5,384,721
[45] Date of Patent: Jan. 24, 1995

[54] INFORMATION PROCESSING SYSTEM WITH A POWER CONTROL UNIT

[75] Inventor: Takuma Joto, Shiki, Japan

[73] Assignee: Sharp Kabushiki Kaisha, Osaka, Japan

[21] Appl. No.: 49,271

[22] Filed: Apr. 19, 1993

[30] Foreign Application Priority Data

Apr. 27, 1992 [JP] Japan .................. 4-107880

[51] Int. Cl.⁶ ............................................. G06F 1/00
[52] U.S. Cl. ........................................ 364/707; 341/26
[58] Field of Search ................ 364/707, 706, 709; 341/22-26

[56] References Cited

U.S. PATENT DOCUMENTS

| | | | |
|---|---|---|---|
| 4,060,163 | 11/1977 | Willingham | 197/105 |
| 4,285,043 | 8/1981 | Hashimoto et al. | 364/707 |
| 4,887,082 | 12/1989 | Yamada | 341/26 |
| 5,041,964 | 8/1991 | Cole et al. | 364/200 |

FOREIGN PATENT DOCUMENTS

| | | |
|---|---|---|
| 0361869A3 | 4/1990 | European Pat. Off. . |
| 2664998 | 1/1992 | France . |
| 59206966 | 4/1985 | Japan . |
| 63075871 | 8/1986 | Japan . |
| 3-280115 | 12/1991 | Japan . |

Primary Examiner—Roy N. Envall, Jr.
Assistant Examiner—Emmanuel L. Moise
Attorney, Agent, or Firm—David G. Conlin; Henry D. Pahl, Jr.

[57] ABSTRACT

An information processing system for processing an application program provides a power control unit being operated at a run mode at which the system is powered and a standby mode at which part of the system is powered. The system further includes functions of inputting any key on a keyboard into an application program, transferring the run mode to the standby mode by pressing a special key on the keyboard, transferring the standby mode to the run mode by pressing any key on the keyboard, detecting no key input takes place for a certain interval of time; and transferring to the standby mode if the detecting means does not detect any occurence of key input for a constant time at the run mode. The system further has function of detecting one key is continuously pressed for a predetermined interval of time and transferring to said standby mode upon detection of one key continuous input.

8 Claims, 12 Drawing Sheets

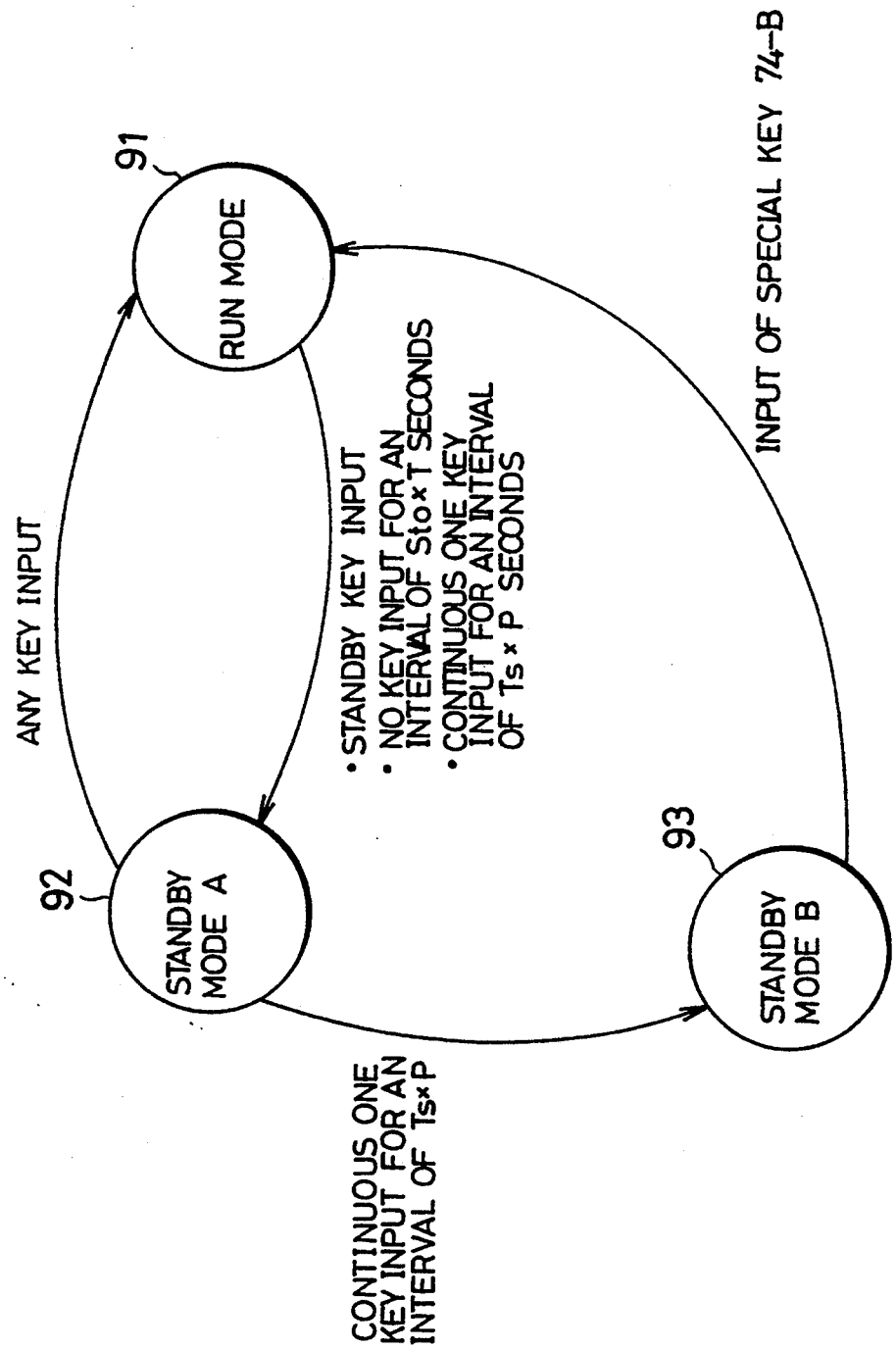

INFORMATION PROCESSING SYSTEM WITH A POWER CONTROL UNIT

BACKGROUND OF THE INVENTION

1. Field of the Invention

The present invention relates to an information processing system for processing an application program, more particularly to an information processing system having a power control function for controlling a power mode of the system between a run mode at which whole of the system is powered and a standby mode at which part of the system is powered to save the power consumption.

2. Description of the Related Art

The inventors of the present application know that there has been theretofore proposed an example of an information processing system having a power control function as shown in FIG. 1. As shown, the information processing system is arranged to have a power control unit 11 for controlling a power supply of the overall system, a keyboard input unit 12 for converting a pressed key of a keyboard 15 into the corresponding data, a central processing unit (CPU) 13 for controlling an operation of the system, and a storage unit for storing the data to be processed.

In operation, in an initial state, the system stays at a sleep mode or a standby mode in which no power is put into the CPU 13 and the storage unit 14 so that the overall system may be held at low power consumption. At this mode, the signal corresponding to a pressed key of the keyboard 15 is generated by the keyboard input unit 12 and then is output onto a signal line. If any key of the keyboard 15 is pressed, the power control unit 11 puts the power into the CPU 13 and the storage unit 14 in response to the signal generated from the keyboard input unit 12 by pressing the key. Then, the system control is passed to the CPU 13.

The above operation makes it possible to put the power into the system only by pressing any key of the keyboard 15.

The arrangement of the information processing system provided with the power control unit will be described as referring to FIG. 2 for understanding the system more concretely.

FIG. 2 is a block diagram showing a known information processing system. As shown, a numeral 21 denotes a power source. The power source supplies power to a power control unit 22 for controlling how the system is powered on and off. A numeral 23 denotes a keyboard control unit for controlling a keyboard 24. A numeral 25 denotes a central processing unit (CPU). A numeral 26 denotes a main storage unit. A numeral 27 denotes a display unit.

The power control unit 22, the keyboard control unit 23, the CPU 25 and the main storage unit 26 are connected to one another through a system bus 28. The keyboard control unit 23, the power control unit 22 and the CPU 25 are connected by a keyboard interrupt control line 29 to supply from the keyboard control unit 23 to the power control unit 22 and the CPU 25 a keyboard interrupt signal. The power control unit 22 and the CPU 25 are connected by a standby interrupt control line 30 to supply from the power control unit 22 to the CPU. The power control unit, the CPU, and the display unit 27 are connected by a power supply line 31 to supply the CPU 31 and the display unit 27 with the power.

The power control unit is provided with a key input monitor section 221 for monitoring a key input sent from the keyboard control unit 23 and a power control section 222 for controlling the power-on and power-off of the CPU 25 and the display unit 27.

The keyboard control unit is provided with a key code register 231 for storing a key code for any key on the keyboard 24.

The keyboard 24 has N keys 24-1 to N. A numeral 24-A denotes a standby key allocated for transferring the system power mode to a standby mode.

In the CPU, there is provided with a group of registers 251.

The main storage 26 has a storage area 261 for the register group for saving the content of the register group 25 immediately before transferring the power mode to the standby mode and a key code queue 262 for storing key code information. A numeral 263 denotes an application program located in the main storage unit 26, the program being processed by the CPU 25. A numeral 264 denotes a standby interrupt program to be started when a standby interrupt takes place. A numeral 265 denotes a restart processing program to be started at first when powered. A numeral 266 denotes a keyboard interrupt program to be started when a keyboard interrupt takes place.

Next, the description will be oriented to the power control unit 11 of the known system as referring to FIG. 3.

FIG. 3 is a block diagram showing the power control unit 22. As shown, the power control unit 22 is composed of the key input monitor unit 221 and the power control section 222. The key input monitor unit 221 has a standby timer 2211 to be incremented if no keyboard interrupt signal is generated within a certain interval of time. The power control section 222 has a power control register 2221 for storing power control information.

Then, the description will be oriented to the operation of the known system based on the arrangements shown in FIGS. 2 and 3.

In the known system, the power control unit 22, the keyboard control unit 23 and the main storage unit 26 are constantly powered on. The power is fed to the CPU 25 and the display unit 27 on the power supply line 31. The power control unit 22 serves to power on and off the CPU 25 and the display unit 27.

The known system provides two modes, a run mode and a standby mode. At the run mode, the power control unit 22, the keyboard control unit 23, the keyboard control unit 23, the CPU 25, the main storage unit 28 and the display unit 27 are all powered on. At the standby mode, the power control unit 22, the keyboard control unit 23 and the main storage unit 26 are powered on but the CPU 25 and the display unit 27 are powered off.

The key input monitor section 221 monitors the keyboard interrupt signal. If no key input is given for a certain time, the unit 221 sends out the standby interrupt signal onto the standby interrupt control line 23 so that a standby interrupt may be issued to the CPU 25. The standby timer 2211 is an up counter to be incremented at each period of T seconds and is cleared by the keyboard interrupt signal sent on the keyboard interrupt control line 29. If any key input takes place, the standby timer 2211 is set to an initial value, zero. If no key input takes place, the standby timer 2211 is incremented at each period of T seconds. The key input monitor section 221 determines whether or not the standby timer 2211 has a higher value than a predetermined standby timeout value Sto. If the standby timer 2211 has a higher value than the standby timeout value Sto, that is, if no keyboard interrupt signal is sent out of the keyboard control unit 23 for an interval of Sto×T represented by a product of the standby timeout value Sto and the period T seconds, the key input monitor unit 221 sends out the standby interrupt signal to the standby interrupt control line 30.

The power control unit 22 can power on or off the power supply line 31 according to the value set to the power control register 2221. That is, if the power control register 2221 stores a value of "1", the power supply line 31 is powered so that the CPU 25 and the display unit 27 are powered on, thereby putting the power mode to a run mode. If the power control register 2221 stores a value of "0", the power control section 222 powers off the power supply line 31, the CPU 25 and the display unit 27, thereby putting the power mode to the standby mode. If a keyboard interrupt signal is input, the power control section 222 stores a value of "1" in the power control register 2221. That is, at the standby mode, the CPU 25 and the display unit 27 are powered so as to change the mode from the standby mode to the run mode.

In a case that the system is at the run mode and the CPU 25 executes the application program 263, assume that a user presses any key 24-M except the standby key 24-A of the keys 24-1 to N for handling the application program 263. The keyboard control unit 23 stores a key code for the pressed key 24-M and the key code data Qm formed by setting the key press data to "1" in the key code register 231 and then sends out the keyboard interrupt signal to the keyboard interrupt control line 29. By sending out the keyboard interrupt signal onto the keyboard interrupt control line 29, a keyboard interrupt takes place in the CPU 25 and then the keyboard interrupt program 266 is started.

FIG. 4 shows the content of the keyboard interrupt program 266. If the keyboard interrupt takes place, the control is started. At a step 41, the CPU 25 reads the key code data Qm from the key code register 231. Then, at a step S42, it is determined if the standby key 24-A is pressed from the key code of the key code data Qm. In this case, since the user presses the key 24-M except the standby key 24-A, the control is passed to the step S43. At this step, the key code data Qm is stored in the key code queue 262 and then the system returns from the keyboard interrupt program 266. The application program 263 reads the key code data Qm stored by the keyboard interrupt program 264 from the key code queue 262 if necessary and performs the processing for the pressed key. As mentioned above, the key input from the user to the application program is made possible.

Next, the description will be oriented to how the processing is carried out if the standby key is pressed at the run mode.

In a case that the system stays at the run mode and the user presses the standby key 24-A for transferring the system mode to the standby mode, the keyboard control unit 23 stores in the key code register 231 the key code data Qa formed by setting to "1" the key code and the key press data for the pressed standby key 24-A and sends out the keyboard interrupt signal onto the keyboard interrupt control line 29. By sending the keyboard interrupt signal to the keyboard interrupt control line 29, the keyboard interrupt takes place in the CPU 25. Then, the keyboard interrupt program 266 is started.

Turning to FIG. 4 showing the content of the keyboard interrupt program 266. The keyboard interrupt is performed to transfer control to the keyboard interrupt processing. At the step S41, the CPU 25 reads the key code data Qa from the key code register 231 and then control is passed to the step S42. At the step, it is determined whether or not the standby key 24-A is pressed on the key code of the key code data Qa. In this case, since the user presses the standby key 24-A, the control is passed to the step S44. At this step, the content of the register group 251 needed when the processing is restarted is stored in the storage area 261 of the register group in a manner to restart the processing immediately before the keyboard interrupt takes place if the CPU 25 cuts off the system power and then turns on the power. The control is passed to the step S45. At this step, the CPU 25 stores the power control data "0" in the power control register 2221 and then terminates the processing. As mentioned above, the CPU 25 operates to store the power control data "0" in the power control register 2221. Hence, the power control section 222 powers off the power supply line 31 and then the CPU 25 and the display unit 27.

This is the process of transferring a system mode to the standby mode if the user presses the standby key 24-A.

Next, the description will be oriented to how the processing is carried out if no key input is given for an interval of Sto×T seconds at the run mode.

If no keyboard interrupt is issued by the keyboard control unit 23 for an interval of Sto×T seconds, the key input monitor section 221 sends out a standby interrupt signal onto the standby interrupt control line 30. By sending the standby interrupt signal onto the standby interrupt control line 30, a standby interrupt takes place in the CPU 25 so that the standby interrupt program 264 may be started.

How the standby interrupt program 264 is operated will be described with reference to FIG. 5. The control is started when a standby interrupt takes place. At a step S51, the content of the register group 251 needed for restarting the processing immediately before the standby interrupt takes place is stored in the storage area 261 of the register group in a manner to restart the processing immediately before the standby interrupt takes place if the CPU 25 cuts off the system power and then turns on the power. Then, the control is passed to a step S52. At the step S52, the CPU 25 stores the power control data "0" in the power control register 2221 and then terminates the processing. Since the CPU 25 stores the power control data "0" in the power control register 2221, the power control unit 222 turns off the power supply line 31 and then the CPU 25 and the display unit 27. As mentioned above, if a user does not press any key for a constant interval of Sto×T seconds, the system mode can be automatically transferred to the standby mode.

Next, the description will be oriented to how the processing is carried out if any key is pressed at the standby mode.

If the system stays at the standby mode and a user presses any key 24-K on the keyboard, the keyboard control unit 23 stores in the key code register 231 the key code data Qk formed by setting to "1" the key code and the key press data for the pressed key 24-K and sends out a keyboard interrupt signal onto the keyboard interrupt control line 29. The keyboard interrupt signal is transmitted to the power control unit 22 through the keyboard interrupt signal control line 29.

How the power control unit 2221 operates will be described as referring to FIG. 3. The keyboard interrupt signal input from the keyboard interrupt control line 29 is transmitted to the power control section 222. In response to the keyboard interrupt signal, the power control section 222 stores a value of "1" in the power control register 2221. Hence, the power control section 222 powers on the power supply line 31 and then the CPU 25 and the display unit 27. The CPU 25, powered by the power control section 222, operates to start the restart program 265 for the first time.

Then, how the restart program 265 is operated will be described as referring to FIG. 6. By powering on the CPU 25, the restart program 265 is started. At a step S61, the CPU 25 operates to return to the register group 251 the content of the register group storage area saved immediately before transferring the system mode to the standby mode. This makes it possible to return to the application program 26 operated immediately before transferring to the standby mode.

In turn, the description will be oriented to how the power mode is transferred in the system according to the known art.

In FIG. 7, a numeral 41 denotes the run mode and a numeral 42 denotes the standby mode. If the system stays at the standby mode 42, the transfer condition from the mode to the run mode 41 is any key input of the keys 24-1 to N. If the system stays at the run mode 41, the transfer condition to the standby mode 42 is an input of the standby key 24-A or the state that no key input takes place for more than an interval of $S$ to $\times T$ seconds.

As mentioned above, by inputting any key input to the application program at the run mode and pressing the standby key at the run mode, the system mode is shifted to the standby mode. Further, if no key input is issued for a certain interval or more at the run mode, that is, if a user does not use this system for a certain time or more, the system mode is automatically transferred to the standby mode. Moreover, by pressing any key on the keyboard, the system mode can be shifted to the run mode.

According to the foregoing process, by transferring to the run mode by pressing any key at the standby mode, it is possible to restart the processing immediately before transferring to the standby mode. The foregoing known system can use an interrupted application program at once. Further, if a user does not use the system for a certain time, the system mode is automatically transferred from the run mode to the standby mode.

However, the known system may be powered on by unintentional press of a key, for example, by placing something on the keyboard. In this case, the known system consumes unnecessary power if it is not use.

More concretely, if something is placed on the keyboard at the standby mode, the system mode is unintentionally transferred to the run mode. Further, if it is placed on the keyboard at the run mode, the automatic transfer of the run mode to the standby mode is disallowed unless the user uses the system for a certain time. Moreover, If the information processing system is a portable type, something comes into contact with the system when it is in a bag so that an unintentional key input may take place. That is, though the user has no intention of using the system, the system mode is unintentionally transferred from the standby mode to the run mode. This results in consuming unnecessary power. If the system is battery-driven, the life of the battery is made shorter.

SUMMARY OF THE INVENTION

It is an object of the present invention to provide a power control unit provided in an information processing system which is capable of preventing unintentional consumption of power when it is not used.

In carrying out, an information processing system for processing an application program, providing a power control unit being operated at a run mode at which the system is powered and a standby mode at which part of the system is powered, includes: means for inputting any key on a keyboard into an application program; means for transferring the run mode to the standby mode by pressing a special key on the keyboard; means for transferring the standby mode to the run mode by pressing any key on the keyboard; means for detecting no key input takes place for a certain interval of time; and means for transferring to the standby mode if the detecting means does not detect occurrence of key input for a constant time at the run mode.

A key input occurring if something is placed on the keyboard or if something comes into contact with the keyboard when the small-sized system is in a bag has a feature of continuous press of the same key for a certain interval of time. Focusing on this feature, there is provided means for monitoring continuous occurrence of one key input for a certain time. The monitoring means operates to determine that the continuous occurrence of one key input is unintentional and transfer the system mode to a suitable mode for preventing waste of power.

The one key input monitor section is provided in the power control unit for that purpose. The section operates to detect the continuous occurrence of one key input for a certain time. If one key input is continuously given for a certain time at the run mode, the monitor means operates to transfer the run mode to the standby mode. If the same thing occurs at the standby mode, the mode is not transferred to the run mode. The transfer condition of the standby mode to the run mode is restrictively changed from any key input to a special key input. This makes it possible to prevent wasteful consumption of power if an unintentional key input takes place.

As stated above, the present invention provides several capabilities of entering a user's key input to an application program at the run mode, transferring the run mode to the standby mode by pressing the standby key if the system stays at the run mode, automatically transferring the mode from the run mode to the standby mode if no key input takes place for a certain interval of time at the run mode, that is, if a user does not use the present system for a certain interval of time, transferring the mode from the standby mode to the run mode by pressing any key on the keyboard, restricting the transfer condition from the standby mode to the run mode to a special key if one key input takes place for a certain interval of time at the standby mode, and automatically transferring the mode from the run mode to the standby mode if one key input takes place for a certain interval of time at the run mode.

As such, by transferring the standby mode to the run mode by pressing any key at the standby mode, it is possible to restart the processing immediately before the mode has been transferred from the run mode to the standby mode so that the interrupted application program may be usable at once. If a user does not use the present system for a certain interval of time, the system mode is automatically transferred from the run mode to the standby mode. This results in being able to prolong the life of a battery if the information processing system is battery-driven. Further, if something is placed on the keyboard and something comes into contact with the keyboard when the small-sized system is in a sac, continuous occurrence of one key input takes place for a certain interval of time at the run mode. In this case, the run mode is allowed to be transferred to the standby mode. In a case that continuous occurrence of one key input takes place for a certain interval of time at the standby mode if something is placed on the keyboard or something comes into contact with the keyboard when the small-sized system is in a sac, the transfer condition from the standby mode to the run mode is restricted by the input of a special key for preventing unintentional transfer to the run mode. This results in preventing wasteful consumption of a power and prolonging the left of a battery when the system is battery-driven.

Further objects and advantages of the present invention will be apparent from the following description of the preferred embodiments of the invention as illustrated in the accompanying drawings.

BRIEF DESCRIPTION OF THE DRAWINGS

FIG. 15 is a view showing the shift of a power mode in the present invention.

DESCRIPTION OF THE PREFERRED EMBODIMENTS

Figure 1:
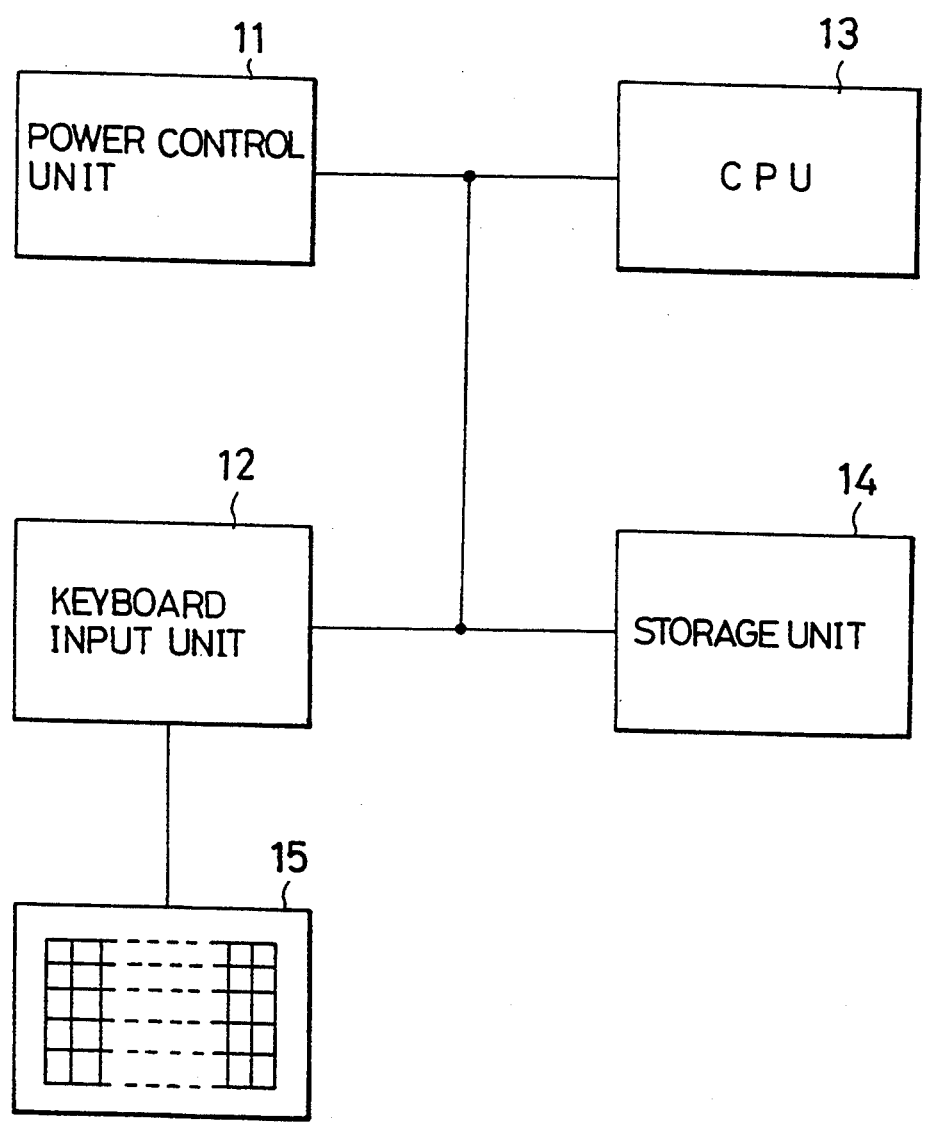
FIG. 1 is a block diagram showing an information processing system according to the related art of the invention.
Figure 2:
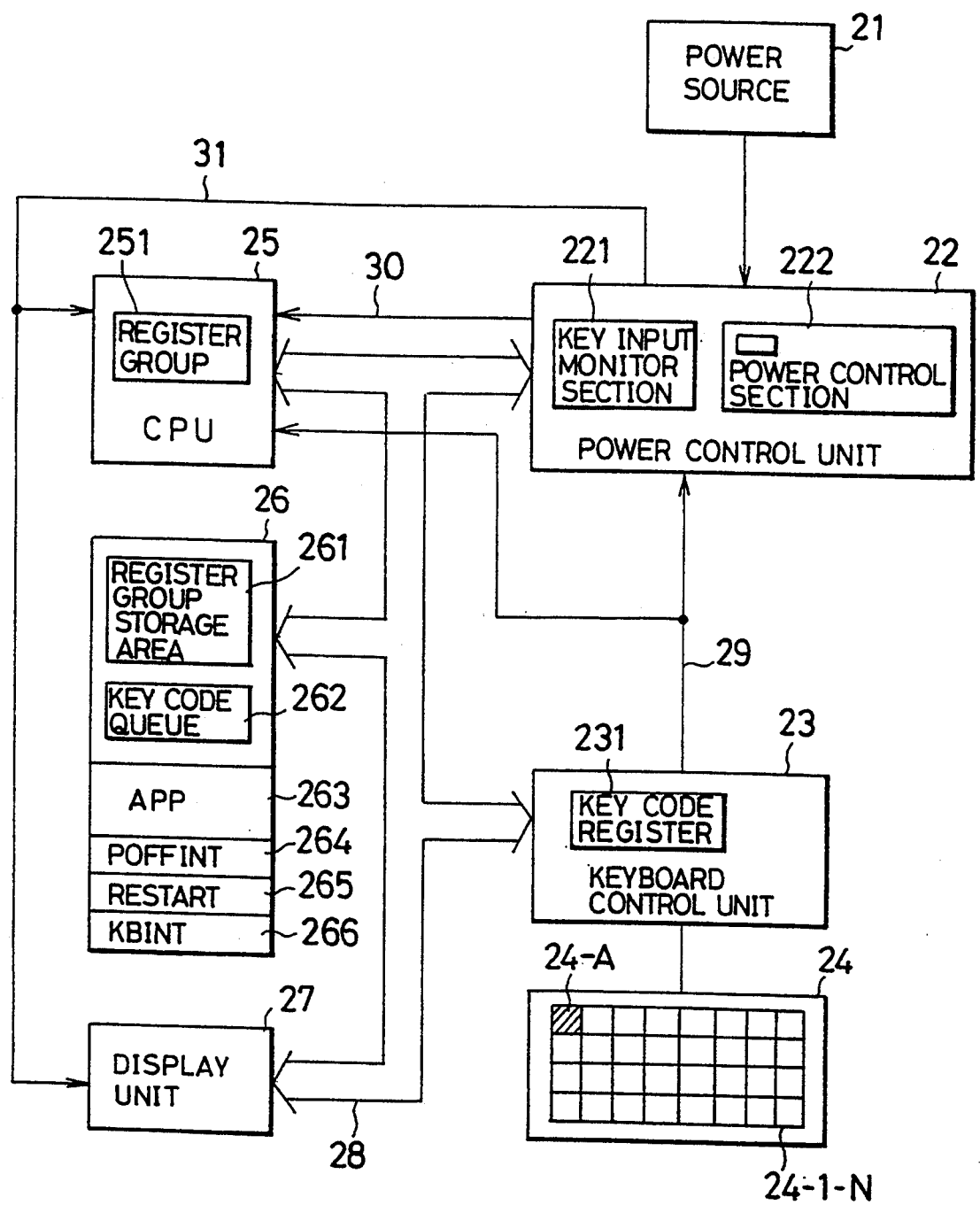
FIG. 2 is a block diagram showing an information processing system according to the other related art of the invention.
Figure 3:
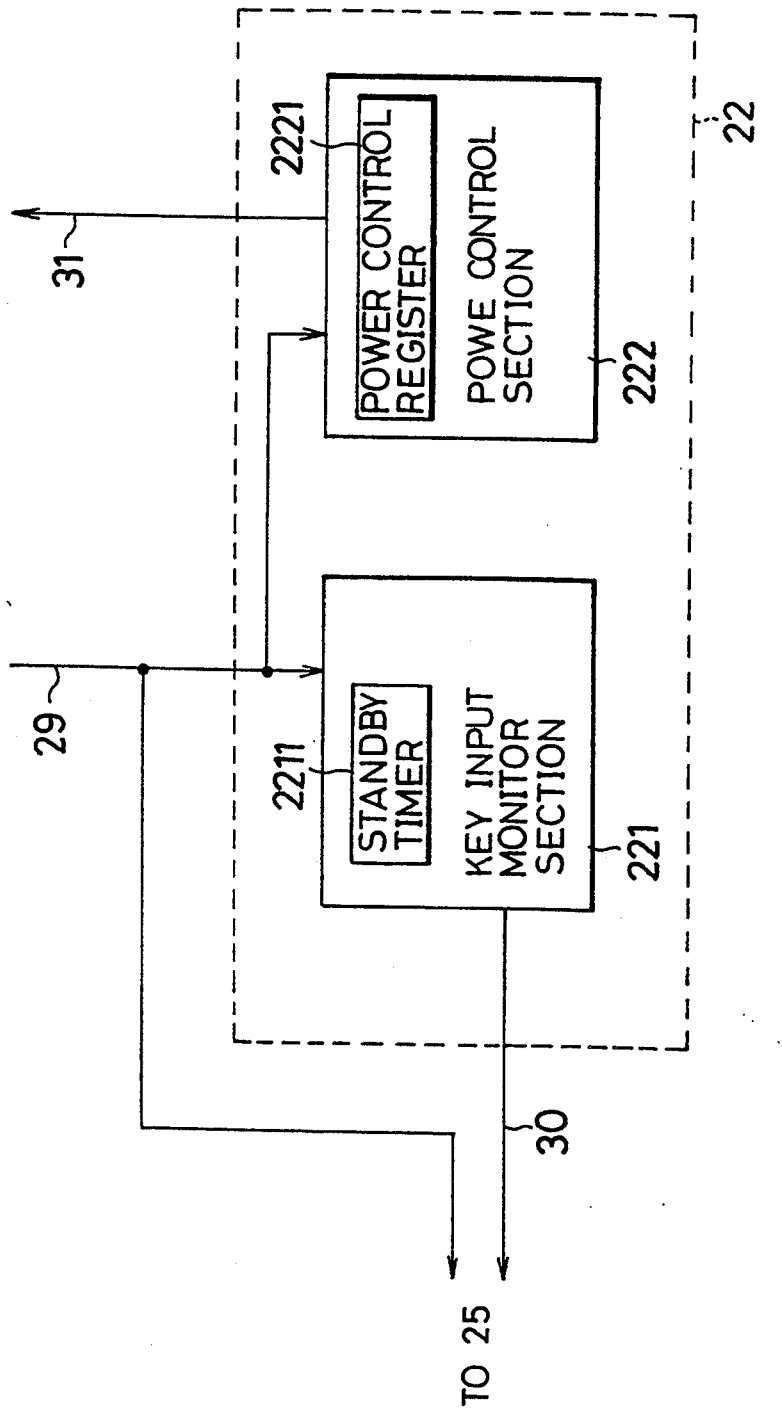
FIG. 3 is a block diagram showing a power control unit included in the related art.

Now, the description will be oriented to an embodiment of the present invention as referring to the drawings.

Figure 8:
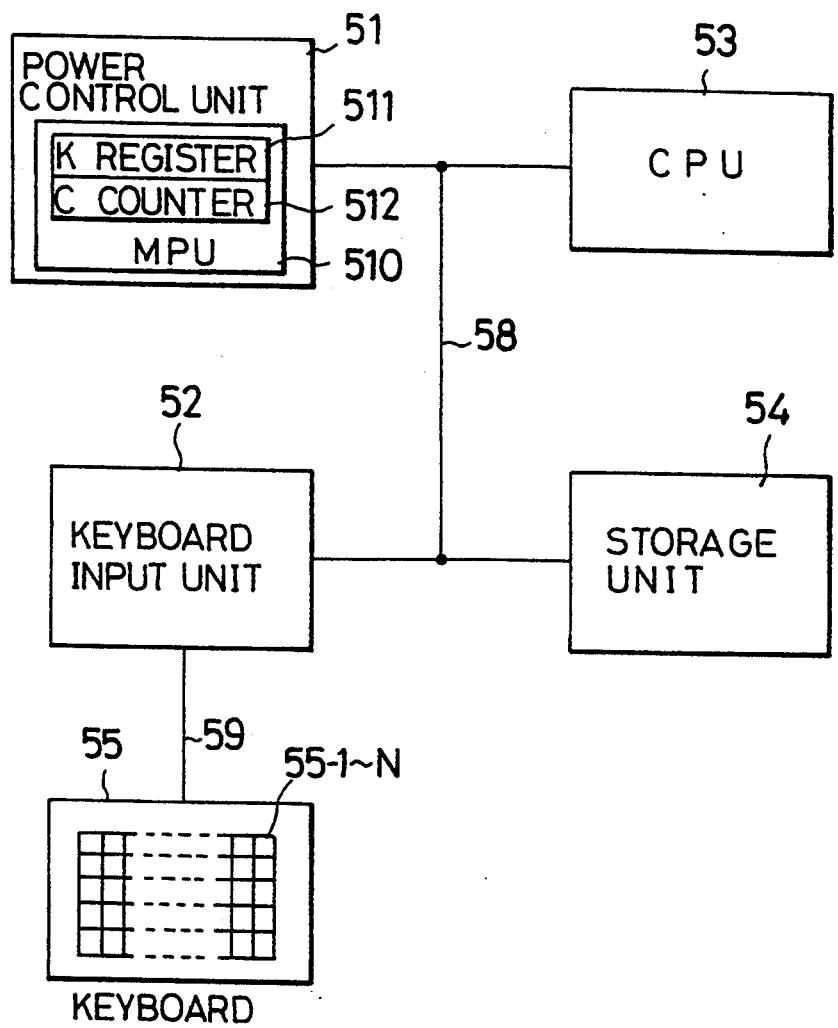
FIG. 8 is a block diagram showing an information processing system according to an embodiment of the present invention.

FIG. 8 is a block diagram showing an information processing system provided with a power control unit according to an embodiment of the present invention. As shown, the system is arranged to have a power control unit 51 for controlling a power of the overall system (not shown), a keyboard input unit 52 for converting a pressed key switch into the keyboard data, a CPU (53) for controlling the operation of the system, and a storage unit 54 for storing the data being processed. The CPU 53, the storage unit 54, the power control unit 51 and the keyboard input unit 52 are connected through a control line 58 and the keyboard input unit 52 and the keyboard 55 are connected by a signal line 59.

The power control unit 51 includes a microcomputer (MPU) 510, which is a so-called one-chip MPU having a key code storage register (referred to as "K register) and a counter (referred to as "C counter") for measuring a pressing time when one key is pressed. This MPU controls the operation of the flowchart shown in FIG. 10. The keyboard input unit 521 serves to convert the key switch press signal input from the keyboard 55 into the keyboard data 60 shown in FIG. 9 and send out the data 60 onto the control line 58. The keyboard includes N key switch groups and operates to output a press signal of the key switch to the keyboard input unit 52.

Figure 9:
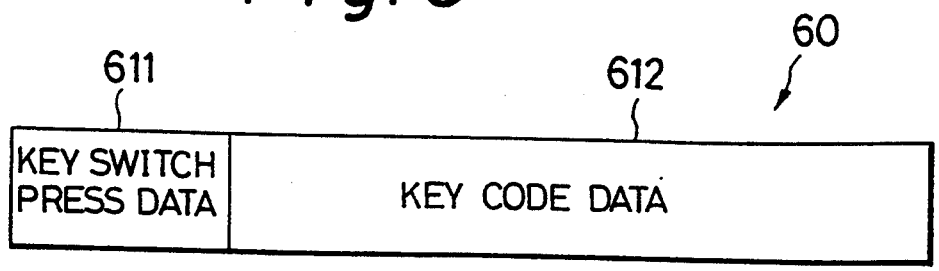
FIG. 9 is a view showing a data format of a keyboard data to be treated in the system shown in FIG. 8.

Turning to FIG. 9, which shows a data format of the keyboard data 60 converted by the keyboard input unit 52. This data consists of a key switch press data 611 and a key switch data 612. The key switch press data 611 takes a value of "0" if no key of the key switch groups 55-1 to N is pressed and a value of "1" if any one or more of the key switch groups 55-1 to N are pressed. The key code data 612 is identification data of the key switch groups 55-1 to N in which the code for the code number of the pressed key switch is stored. It means that if a plurality of key code data 612 obtained by different means have the same code, those key code data are obtained by pressing one key and if they do not have the same code, those key code data are obtained by pressing different keys.

Figure 10:
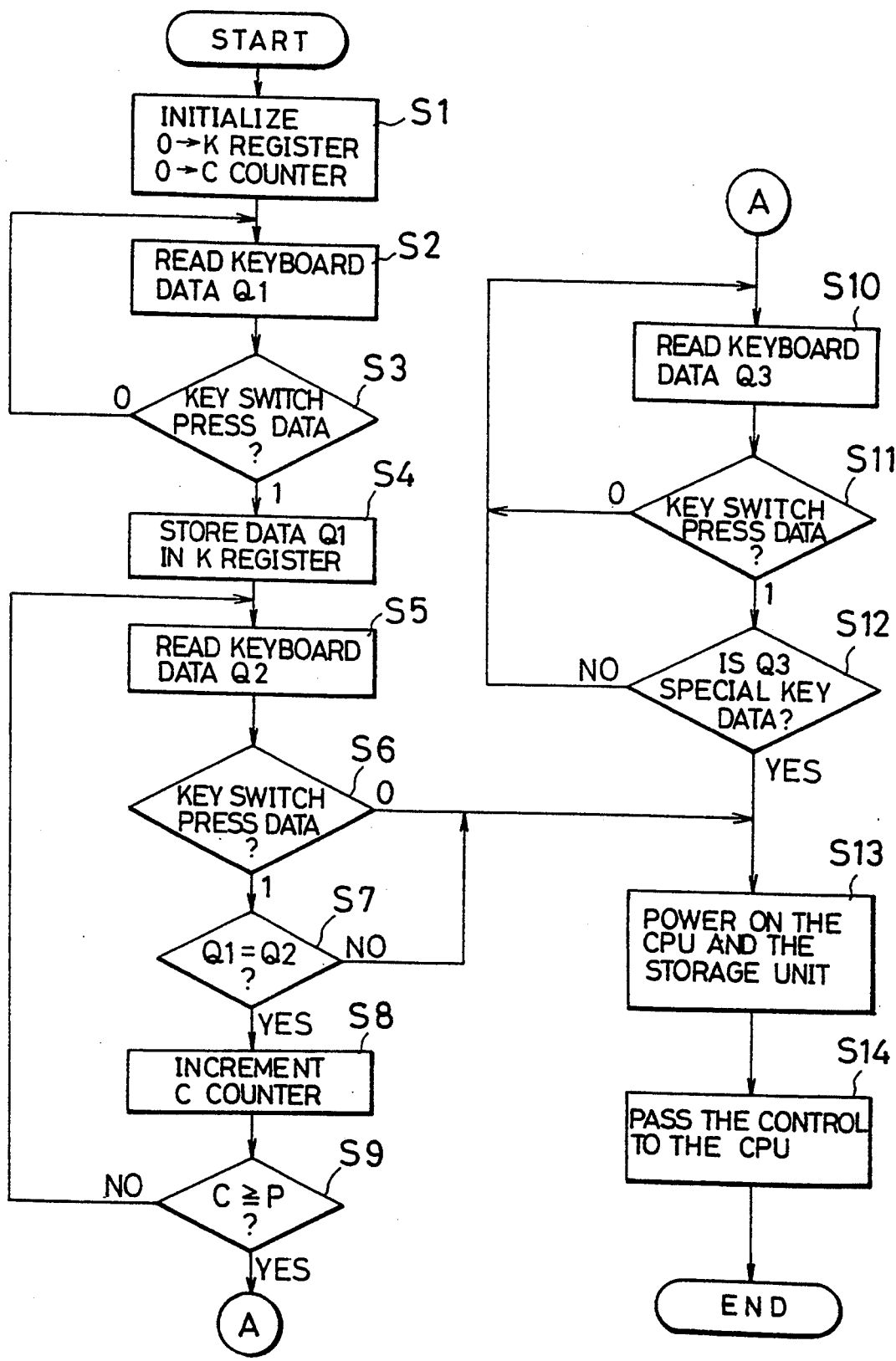
FIG. 10 is a flowchart showing an operation of a power control unit included in the system shown in FIG. 8.

In turn, the description will be oriented to how the power control unit operates as referring to FIGS. 8 and 10.

FIG. 10 is a flowchart showing how the power control unit 51 operates. As mentioned above, the MPU 510 (see FIG. 8) included in the power control unit 51 controls to operate the power control unit 51 itself. At a start of processing, the CPU 53 and the storage unit 54 are not powered. That is, the system stays at the sleep mode where the power consumption is low. At a step S1, the MPU 510 operates to set a K register 511 and a C counter 512 to "0", that is, initializes them. At a step S2, the keyboard input unit 52 reads the keyboard data Q1. The format of the keyboard data Q is shown in FIG. 9. At a step S3, it is determined if the key switch press data 611 is "1". If it is "0", no key switch is pressed. Hence, the control is passed to the step S2 at which the keyboard data Q1 is read again.

If it is "1", it means that any one of the key switches 55-1 to N is pressed. Hence, the control is passed to a step S4. At this step, the key code data 612 of the keyboard data read at the step S2 is stored in the K register 511 included in the power control unit 51. At a step S5, the power control unit 51 reads the keyboard data Q2 from the keyboard input unit 52 again. At a step S6, it is determined if the key switch press data 611 of the keyboard data Q2 read at this step S5 is "0" or "1". If it is "0", the pressed key switch is released off a finger at the step S5. Hence, the keyboard data Q1 is determined to be give by intentional press of the key. Then, the control is passed to steps S13 and S14 for proceeding the powering of the system.

If the key switch press data 611 is "1", the control is passed to a step S7. At this step, the key code data 812 of the keyboard data Q1 stored in the K register 511 at the step S4 is compared with the key code data 612 of the keyboard data Q1 read at the step S5 for determining whether or not the pressed switches are the same one. If the code of the key code data 612 of Q1 is not matched to the code of the key code data 812 of Q2 (Q1=Q2), the key switch pressed at the step S2 is different from the key switch pressed at the step S5. Hence, the key press is determined to be user-intentional. Then, the control is passed to the steps S13 and 14 for proceeding the powering of the system.

If the value of the K register 511 is matched to the code of the key code data 612 (Q1=Q2), the key switch pressed at the step S2 is equal to the key switch pressed at the step S15. It is determined that one key is kept being pressed. Then, the control is passed to a step S8. At this step, the C counter 512 is incremented. At a next step S9, the value of the C counter 511 is compared with a predetermined limit time P for determining if the value of the C counter 512 exceeds the limit time P. If not, the control returns to the step S5 at which the keyboard data Q2 is read by the keyboard input unit 2 again. The loop process of the steps S5 to S9 is repeated until the condition C≧P is met if Q1=Q2.

If the value of the C counter 512 exceeds the limit value P, the key press is determined not to be user-intentional. Then, the control is passed to steps S10 to S12 for processing a special key. At the step S10, the power control unit 51 reads the keyboard data Q3 from the keyboard input unit 52. At the step S11, it is determined if the key switch press data 611 of the keyboard data Q3 is "0" or "1". If it is "0", no key switch press is executed. Hence, the operation is passed to the step S10 at which the keyboard data Q3 is read by the keyboard input unit again. If the key switch press data 611 is "1", the operation is passed to the step S12. At this step, the key code data 612 of the keyboard data Q3 read at the step S10 is compared with a predetermined special key code value for determining whether or not the special key is pressed. If the code of the key code data 612 is not matched to the code of the special key code, it is determined whether or not the special key is pressed. If both are not matched to each other, no special key is pressed. Then, the control is returned to the step S10 at which the keyboard data Q3 is read by the keyboard input unit 52 again. If the code of the key code data 612 is matched to the code of a special key code, it means that a special key is pressed. Hence, the control is passed to the steps S13 and 14 for proceeding the power-on of the system. At the step S13, the power control unit 51 operates to power on the CPU 53 and the storage unit 54. At the step S14, the power control unit 51 passes the control to the CPU 53. Then, the power control unit 51 terminates its operation.

The foregoing operation can be divided as follows depending on the relation among the keyboard data Q1, Q2, Q3 and the limit time P.

Case 1: A different key operation is done within the limit time P. In this case, the keyboard data Q1 is not equal to Q2. The control goes from the step S7 to the steps S13 and S14. It means that the information processing system is immediately powered on.

Case 2: A different key operation is done after one key is operated within the limit time P. The processing path is the same as the case 1. However, after the different key operation is done, the information processing system is powered on.

Case 3: A special key operation is done after one key is operated for a longer time than the limit time P. The keyboard data is such that Q1=Q2 and Q3=special key. The control is passed through the steps S10 to S18 and S14 before the information processing system is powered on.

Case 4: One key is operated for a longer time than the limit time P. The keyboard data is such that Q1=Q2=Q3. The control is not allowed to exit from the steps S10, S11 and S12. Hence, the information processing system is not powered on.

The limit time P of the C counter for changing the condition of powering on the system and the special key for powering on the system at the step S18 are defined on how the system is used. It is better to provide the special key on the side of the a covered switch or the keyboard 55, because the location is where the erroneous power-on of the system can be easily prevented.

The foregoing operation makes it possible to limit the condition for powering on the system to the special key press if the time for continuing one key press exceeds the limit time.

In turn, the system according to an embodiment of the invention will be discussed in more detail.

Figure 11:
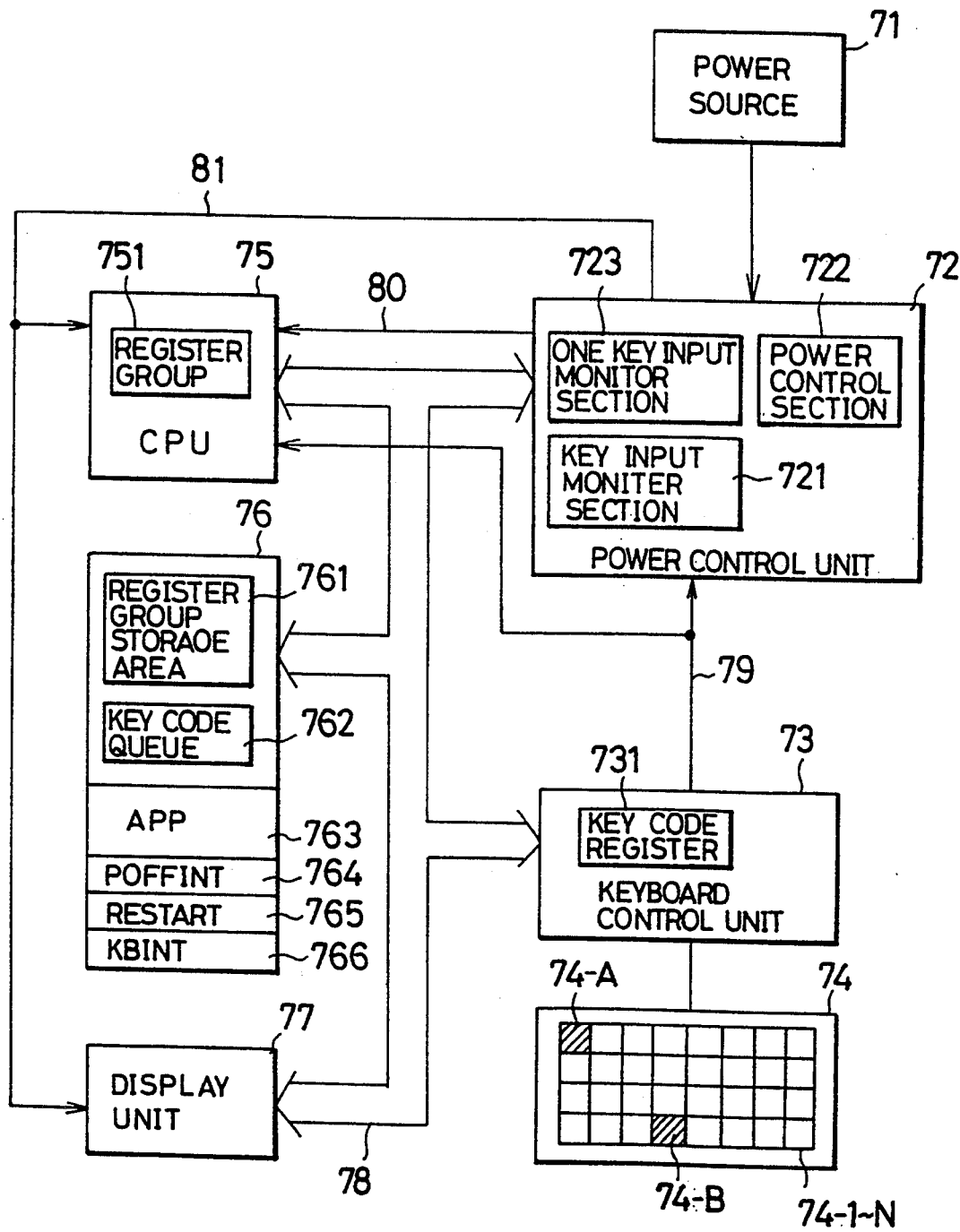
FIG. 11 is a block diagram showing am information processing system according to another embodiment of the present invention.

FIG. 11 is a block diagram showing the system according to the embodiment of the invention. As shown, a numeral 71 denotes a power source. The power source 71 supplies power to a power control unit 72 for controlling a power-on and a power-off of the system. A numeral 78 denotes a keyboard control unit for controlling a keyboard 74. A numeral 75 denotes a central processing unit (CPU). A numeral 76 denotes a main storage unit. A numeral 77 denotes a display unit.

The power control unit 72, the keyboard control unit 78, the CPU 75 and the main storage unit 76 are connected to one another by a system bus 78. The keyboard control unit 78, the power control unit 72 and the CPU 75 are connected by a keybord interrupt control line 79 to supply a keyboard interrupt signal from the keyboard control unit 78 to the power control unit 72 and the CPU. The power control unit 72 and the CPU 75 are connected by a standby interrupt control line 80 to supply a standby interrupt signal from the power control unit 72 to the CPU 75. The power control unit 72, the CPU and the display unit 77 are connected by a power supply line 81 to supply the CPU and the display unit with the power.

The power control unit 72 is provided with a key input monitor section 721 for monitoring a key input given from the keyboard control unit 78, a power control section 722 for controlling a power-on and a power-off of the CPU 75 and the display unit 77 and a one key input monitor section 723 for detecting continuous occurrence of one key input given from the keyboard 79 for a certain interval of time.

The keyboard control unit 73 is provided with a key code register 731 for storing a key code for any key on the keyboard 74.

The keyboard 74 has N keys 74-1 to N. A numeral 74-A denotes a standby key allocated for transferring the mode to the standby mode. A numeral 74-B denotes a special key allocated for transferring from the standby mode to the run mode if one key input continuously takes place for a certain time at the standby mode and the transfer condition to the run mode is restrictively changed from any key press to a special key press.

In the CPU 75, there is provided with a register group.

The main storage 76 has a storage area 761 of the register group for saving the content of the register group 751 immediately before transferring to the standby mode and a key code queue 762 for storing the key code data. A numeral 763 denotes an application program to be processed by the CPU 75 located in the main storage unit 76. A numeral 764 denotes a standby interrupt program to be started if a standby interrupt takes place. A numeral 765 denotes a restart program to be started for the first time if the CPU 75 is powered on. A numeral 766 denotes a keyboard interrupt program to be started if a keyboard interrupt takes place.

The power control unit 72 will be discussed in more detail as referring to FIG. 12.

Figure 12:
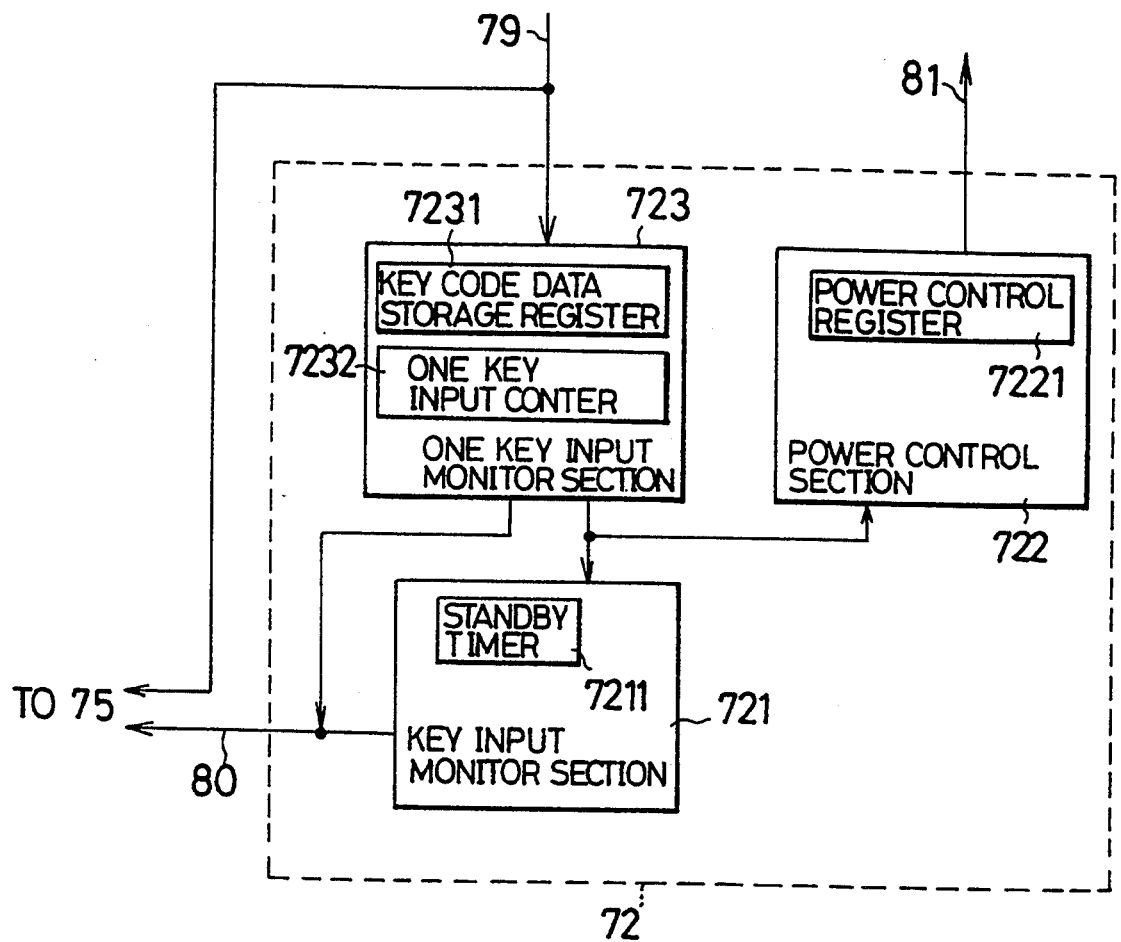
FIG. 12 is a block diagram showing a power control unit included in the system shown in FIG. 11.

FIG. 12 is a block diagram showing a power control unit 72 included in the information processing system according to the invention. As shown, the power control unit 72 is composed of the key input monitor section 721 for monitoring a key input given from the keyboard control unit 73, the power control section 722 for controlling a power-on and a power-off of the CPU 75 and the display unit 77, and a one key input monitor section 723 for detecting continuous occurrence of one key input given from the keyboard 73 for a certain interval of time. A numeral 724 denotes a keyboard activity signal line connected to send from the one key input monitor section 723 to the key input monitor section 721 and the power control section 722 a keyboard activity signal if the key input continuously takes place for a certain interval of time according to the key input monitored result of the key input monitor section 723.

The key input monitor section 721 has a standby timer 7211 to be incremented at each contact time if no keyboard activity signal takes place.

The power control section 722 has a power control register 7221 for saving power control data.

The one key input monitor section 723 has a key code data storage register 7231 for storing key code data for determining that the key input continuously takes place for a certain interval of time, and a one key input counter 7232 for determining that one key input continuously takes place for a certain interval of time.

Figure 13:
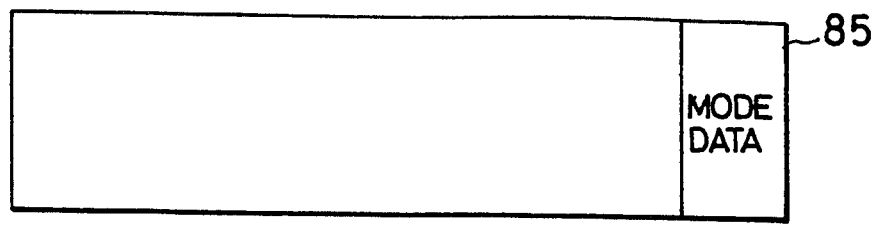
FIG. 13 is a view showing a data format of a power control data to be treated in the system shown in FIG. 11.
Figure 14:
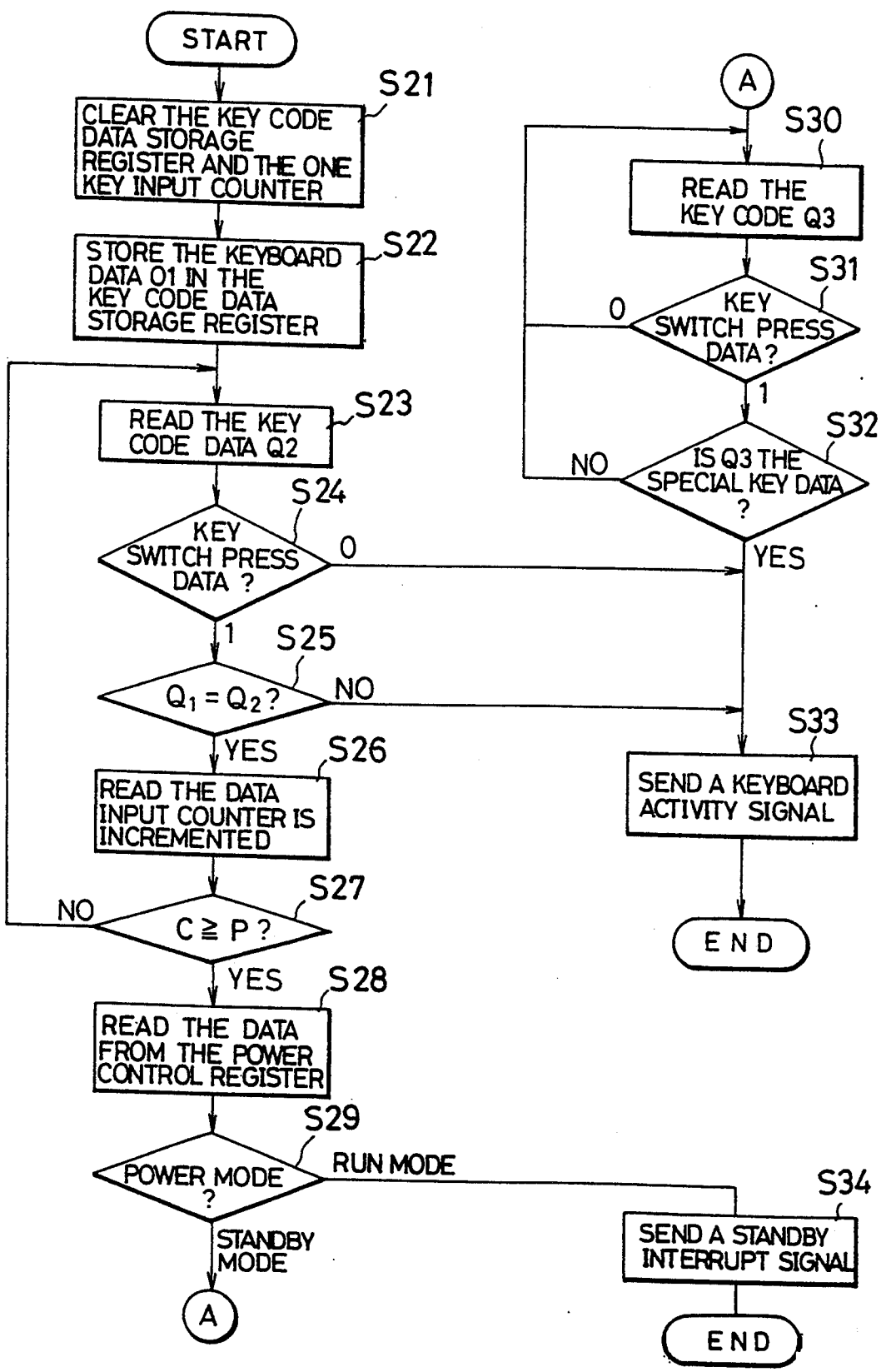
FIG. 14 is a flowchart showing an operation of a one key input monitor section included in the power control unit shown in FIG. 13.

FIG. 13 shows a power control data stored in the power control register 7221 shown in FIG. 12. A numeral 85 denotes a mode data which is a value of "1" if the system stays at the run mode and is a value of "0" if the system stays at the standby mode.

The description will be oriented to a power mode used in the system as referring to FIGS. 11 and 12.

In this invention, the power control unit 72, the keyboard control unit 73 and the main storage unit 76 are constantly powered on. The power is fed to the CPU 75 and the display unit 77 on the power supply line 81 so that the power control unit 72 may power them on and off. The present system provides two modes, that is, a run mode and a standby mode. At the run mode, the power control unit 72, the keyboard control unit 73, the CPU 75, the main storage unit 76 and the display unit 77 are powered on. At the standby mode, the power control unit 72, the keyboard control unit 73 and the main storage unit 76 are powered but the CPU 75 and the display unit 77 are not powered.

Next, the description will be oriented to how the key input monitor section operates as referring to FIGS. 11 and 12.

The key input monitor section 721 operates to monitor the keyboard activity signal sent onto the keyboard activity signal line 724. If no key input is sent for a certain interval of time, a standby interrupt to the CPU 75 takes place. The standby timer 7211 is an up counter to be incremented at each constant period of T seconds and is cleared in response to the keyboard activity signal sent on the keyboard activity signal line 724. That is, if any key input is done, the standby timer 7211 is set to an initial value of zero. If no key input takes place, the standby timer 7211 is incremented at each period of T seconds. The key input monitor unit 721 determines whether or not the value of the standby timer 7211 exceeds a predetermined standby timeout value Sto. If yes, that is, if the one key input monitor unit 723 does not send out a keyboard activity signal for an interval of Sto × T seconds represented by a product of the standby timeout value Sto and a period T seconds, the standby timer 7211 sends out the standby interrupt signal on the standby interrupt control line 80.

Next, the description will be oriented to how the power control section operates as referring to FIGS. 11 and 12.

The power control section 722 enables to power on and off the power supply line 81 according to the value set to the power control register 7221. That is, if a value of "1" is stored in the power control register 7221, the power supply line 81 is powered on so that the CPU 75 and the display unit 77 may be powered on for transferring the power mode to the run mode. If the power control register 7221 stores a value of "0", the power control section 722 powers off the CPU 75 and the display unit 77 so as to transfer the power mode to the standby mode. The power control unit 722 operates to store a value of "1" in the power control register 7221 if it receives a keyboard activity signal. That is, at the standby mode, the CPU 75 and the display unit 77 are powered on and then the power mode is transferred to the run mode.

Next, the description will be directed to how the one key input monitor section operates as referring to FIGS. 11 to 14.

If a keyboard interrupt is sent onto the keyboard interrupt signal line 79, that is, if a key input takes place, the one key input monitor section 723 is started. The operation of the one key input monitor section 723 will be described as referring to FIG. 14. Any key input causes the one key input monitor section 723 to start. At a step S21, the key code data storage register 7231 and the one key input counter 7232 are cleared, that is, initialized. Then, the control goes to a step S22. At this step, the key code data Q1 is read from the key code register 731 and is stored in the key code data storage register 7231. Then, at a step S23, the key code data Q2 is read from the key code register 731. At a next step S24, the key press data of the key code data Q21 is referenced. If the key is pressed, the control goes to a step S25. If no key is pressed, that is, the key input at the previous time is determined to be released, the control goes to a step S23 for sending out the keyboard activity signal. If the key press data is "1" at a step S24, at the step S25, the key code data Q1 stored in the key code data storage register 7231 is compared with the key code data Q2 read at the step S23. If the key code data Q1 is equal to Q2, that is, if the pressed key is a key pressed for starting this operation, the control goes to a step S26. If Q1 is not equal to Q2, that is, the pressed key is not a key pressed for starting this operation, the control goes to a step S23 for sending out the keyboard activity signal. If the key code data Q1 is equal to Q2 at this step S25, at the step S26, the one key input counter 7232 is incremented. Then, the control goes to a step S27. At this step, the value of "C" of one key input counter 7232 is compared with the one key continuous input limit value of "P". If $C \geq P$, the control goes to a step S28. If $C < P$, the control goes to a step S23. At this step, the key code data Q2 is read from the key code register 73 again and then is compared with the key code data Q1 stored in the key code data register 7232. Until the key press data becomes "0", the key code data Q1 does not become equal to Q2 or the value of the one key input counter 7232 becomes higher than the predetermined value P, the process from the steps S23 to S27 is repeated. Assuming that the time for processing the steps S23 to S27 is Ts seconds, if one key input is continuously done, the process from the steps S23 to S27 is repeated for an interval of $Ts \times P$ seconds.

If one key input is continuously done for an interval of $Ts \times P$ seconds, the control goes to a step S28. At this step, the value is read from the power control register 7221 for obtaining the current power mode. Then, the control goes to a step S29. At this step, based on the value of the power control register 7221 read at the step S28, the current power mode is determined. If it is the standby mode, the control goes to a step S30. If it is the run mode, the control goes to a step S24. If the current power mode is at the run mode, at this step S24, the standby interrupt signal is sent out to the CPU 75. If the current power mode is the standby mode, at the step S30, the key code data Q3 is read from the key code register 731. Then, the control goes to a step S31. At this step, by referring to the key press data of the key code data Q3, it is determined if the key is pressed. If the key is pressed, the control goes to a step S32. If no key is pressed, the control goes to the step S30 at which the key code data Q3 is read from the key code register 731 again. The control goes to the step S31. Then, until any one of the keys is pressed, the process from the steps S30 to S31 is repeated. If any one key is pressed, at the step S32, it is determined whether or not the key code data Q3 is matched to the key code data of the special key 74-B. If not matched, the control goes to the step S30. If matched, the control goes to a step S33 for sending out the keyboard activity signal. Until the special key 74-B is pressed, the process from the steps S30 to S32 is repeated. If the special key 74-B is pressed, at the step S33, the keyboard activity signal is sent out to the key input monitor section 721 and the power control section 722 through the keyboard activity signal line 724.

Next, the description will be oriented to the operation of the power control unit if no key input is given at the run mode.

In a case that the system stays at the run mode and the CPU 75 executes the application program 763, if a user pressed any one key 74-M of the keys 74-1 to N except the standby key 74-A is pressed for operating the application program 763, the keyboard control unit 73 stores in the key code register 731 the key code data Qm formed by setting to "1" the key code and the key press data for the pressed key 74-M and sends out the keyboard interrupt signal onto the keyboard interrupt control line 79. By sending the keyboard interrupt signal to the keyboard interrupt control line 79, a keyboard interrupt takes place in the CPU 75 so as to start the keyboard interrupt program 766.

Figure 4:
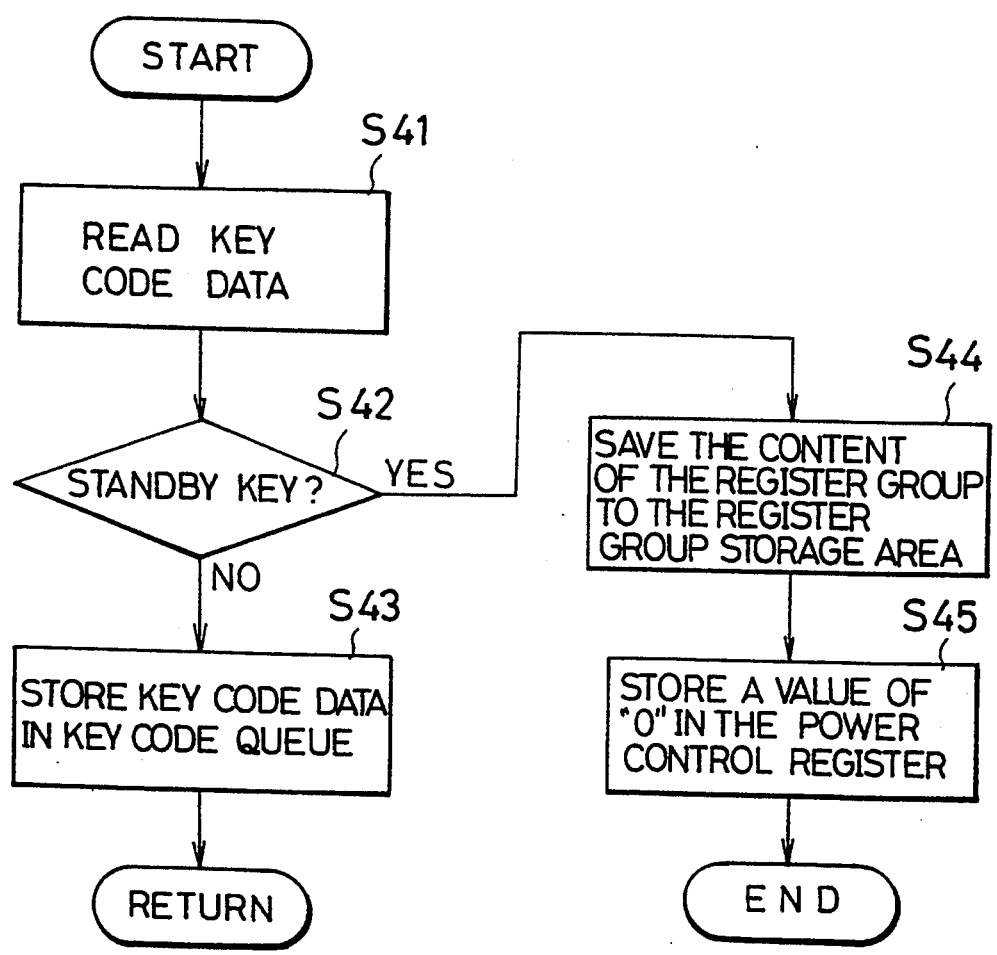
FIG. 4 is a flowchart showing a keyboard interrupt processing operation to be executed in the power control unit.

Turning to FIG. 4 showing the content of the keyboard interrupt program 766, the keyboard interrupt causes the control to go to the start of the program. At a step S41, the CPU 75 reads the key code data Qm from the key code register 731. Then, the control goes to the step 42. At this step, it is determined whether or not the standby key 74-A is pressed on the key code of the key code data Qm. In this case, since the user presses the key 74-M except the standby key 74-A, the control goes to a step S43. At this step, the key code data Qm is stored in the key code queue 762 and then the system is returned from the keyboard interrupt program 764. The application program 763 reads the key code data Qm stored from the key code queue 762 by the keyboard interrupt program 764 if necessary. Then, the processing is done for the pressed key. As mentioned above, the key input from the user can be given to the application program.

Next, the description will be oriented to the operation of the power control unit if the standby key is input at the run mode.

If the system stays at the run mode and the user presses the standby key 74-A for transferring to the standby key, the keyboard control unit 73 stores in the key code register 731 the key code data Qa formed by setting to "1" the key code and the key press data for the pressed standby key 74-A and sends out the keyboard interrupt signal onto the keyboard interrupt control line 79. By sending the keyboard interrupt signal onto the keyboard interrupt control line 79, a keyboard interrupt takes place in the CPU 75 so as to start the keyboard interrupt program 766.

Turning to FIG. 4 which shows the content of the keyboard interrupt program 766, the keyboard interrupt causes the Control to go to the start of the program. At a step S41, the CPU 75 reads the key code data Qa from the key code register 731. Then, the control goes to a step S42. At this step, it is determined whether or not the standby key 74-A is pressed on the key code of the key code data Qa. In this case, since the user presses the standby key 74-A, the control goes to the step S44. At this step, the content of the register group 751 needed for restarting the operation is stored in the register group storage area 761 in a manner to restart the operation immediately before the keyboard interrupt takes place if the CPU 75 is powered off and then on. Then, the control goes to the step S45. At this step, the CPU 75 operates to store the power control data "0" in the power control register 7221 and then terminates its operation. The CPU 75 operates to store the power control data "0" in the power control register 7221. Then, the power control section 722 powers off the power supply line 81 and then the CPU 75 and the display unit 77. As mentioned above, by pressing the standby key 74-A, the user can transfer the mode to the standby mode.

Next, the description will be oriented to the process of the power control unit if no key input is issued for an interval of Sto×T seconds at the run mode.

If the system stays at the run mode and no key input is given for an interval of Sto×T seconds, no keyboard interrupt signal is generated for an interval of Sto×T seconds. Hence, the one key input monitor section 723 does not send out the keyboard activity signal for an interval of Sto×T seconds. As a result, the key input monitor section 721 sends out the standby interrupt signal onto the standby interrupt control line 80. By sending the standby interrupt signal onto the standby interrupt control line 80, a standby interrupt takes place in the CPU 75 so as to start the standby interrupt program 764.

Figure 5:
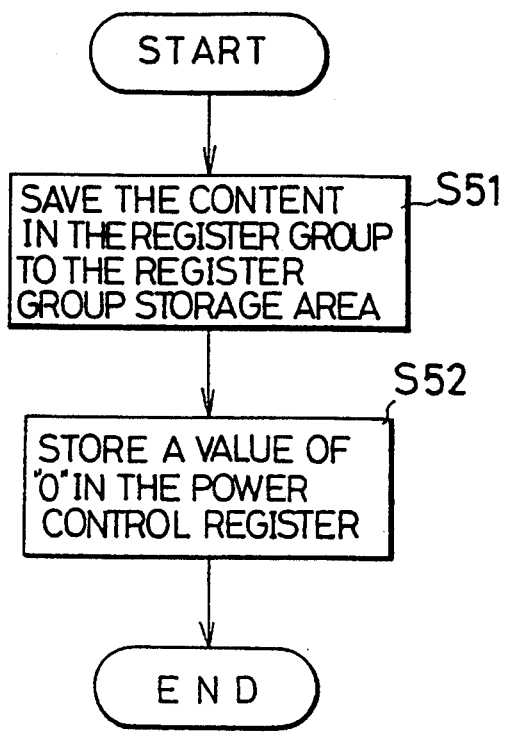
FIG. 5 is a flowchart showing a standby interrupt processing operation to be executed in the power control unit.

Turning to FIG. 5 which shows the content of the standby interrupt program 764, when the standby interrupt takes place, the control goes to the start of the program. At the step S51, the content of the register group 751 needed for restarting the operation is stored in the register group storage area 761 in a manner to restart the operation immediately before the standby interrupt takes place if the CPU 75 is powered off and then on. Then, the control goes to the step S52. At this step, the CPU 75 operates to store the power control data "0" in the power control register 7221 and terminates its operation. Hence, the power control section 722 cuts off the power of the power supply line 81 and then the CPU 75 and the display unit 77. As mentioned above, if no key input is done for a constant time of Sto×T seconds at the run mode, the mode is automatically transferred to the standby mode.

Next, the description will be oriented to the operation of the power control unit if any key is pressed at the standby mode.

If the system stays at the standby mode, any key 74-K on the keyboard is pressed and released within an interval of Ts×P seconds or if any key 74-K is pressed and any key 74-L except the key 74-K is pressed within an interval of Ts×P seconds, the keyboard control unit 73 stores the key code data Qk formed by setting to "1" the key code and the key press data for the pressed key 74-K and then sends out the keyboard interrupt signal onto the keyboard interrupt control line 79. The keyboard interrupt signal is transmitted to the one key input monitor section 723 of the power control unit 72 through the keyboard interrupt control line 79 and starts to operate the one key input monitor section 723. Then, if any key 74-1-K is released, the keyboard control unit 73 stores a value of "0" in the key press data. If the key 74-L except any key 74-K is pressed, the key code data Ql formed by setting the corresponding key code and the key press data to "1" is stored. Then, the one key input monitor section 723 is started. The one key input monitor section 723 performs the process of the steps S21 to S23. If any key 74-K on the keyboard is pressed and is released within an interval of Ts×P seconds, the loop of the steps S23 to S27 exits at the step S24. Then, the control goes to the step S23. If any key 74-K on the keyboard is pressed and then any key 74-L except the key 74-K is pressed within an interval of Ts×P seconds, the loop of the steps S23 to S27 exits at the step S25. The control goes to the step S23. At this step, the one key input monitor section 723 sends out the keyboard activity signal onto the keyboard activity signal line 724 and then terminates its operation. The keyboard activity signal input through the keyboard activity signal line 724 is transmitted to the power control section 722. In response to the keyboard activity signal, the power control section 722 stores a value of "1" to the power control register 722. Since the value of "1" is stored in the power control register 7221, the power control section 722 powers on the power supply line 81 and then the CPU 75 and the display unit 77. The CPU 75 powered by the power control section 722 starts the restart program 765 at first.

Figure 6:
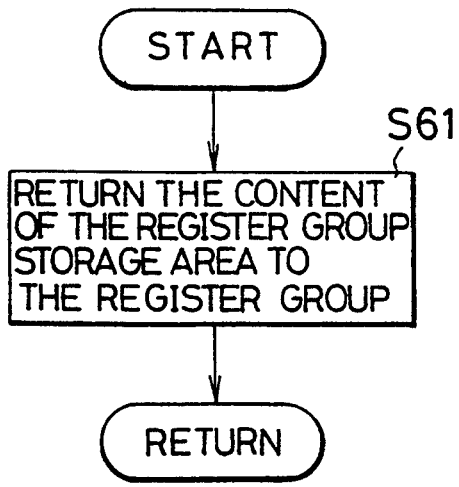
FIG. 6 is a flowchart showing a restart operation to be executed in the power control unit.
Figure 7:
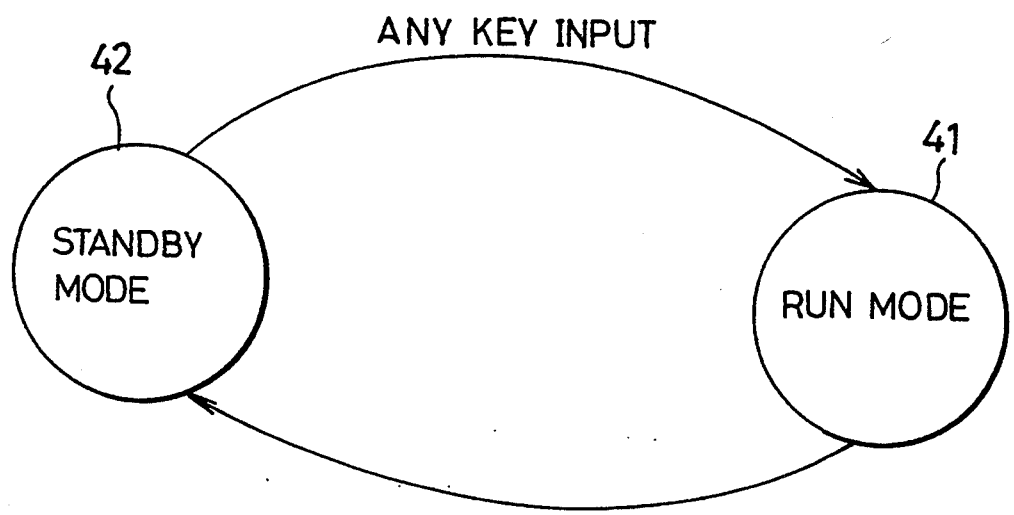
FIG. 7 is a view showing the shift of a power mode in the related art of the invention.

Turning to FIG. 6 which shows the content of the restart program 765, the CPU 75 is powered on. Then, the control goes to the start of the program. At the step S61, the CPU 75 returns to the register group 75 the content of the register group 75 saved in the register group storage area 761 immediately before transferring to the standby mode. As mentioned above, if, at the standby mode, any key 74-K on the keyboard is pressed and then is released within an interval of Ts×P seconds or any key 74-K on the keyboard is pressed and any key 74-L except the key 74-K is pressed, the overall system is powered on in a manner to restart the interrupted application program.

In a case that the system stays at the standby mode if one key input is continuously given for an interval of Ts×P seconds and any key 74-K on the keyboard is kept pressed for an interval of Ts×P seconds or more, the keyboard control unit 73 stores in the key code register 731 the key code data Qk formed by setting to "1" the key code and the key press data for the pressed key 74-K and sends out the keyboard interrupt signal onto the keyboard interrupt control line 79. The keyboard interrupt signal is sent to the one key input monitor section 723 of the power control unit 71 so as to start the operation of the one key input monitor section 723. The one key input monitor section 723 performs the operation of the steps S21 to S23. Since any key 74-K on the keyboard is kept pressed for an interval of Ts×P seconds or more, the loop of the steps S23 to S27 exists at the step S27. Then, the control goes to a step S28. Since the current power mode is the standby mode, at the steps S28 to S29, the control goes to a step S30. Until a special key 74-K is pressed, the process of the steps S30 to S32 is repeated. If the special key 74-B is pressed, at the step S32, the control goes to the step S33. At this step S33, the one key input monitor section 723 sends out the keyboard activity signal onto the keyboard activity signal line 724 and then terminates its operation. The keyboard activity signal input through the keyboard activity signal line 724 is transmitted to the power control unit 722. In response to the keyboard activity signal, the power control unit 722 stores a value of "1" in the power control register 7221. Since the power control register 7221 stores a value of "1", the power control section 722 powers on the power supply line 81 and then the CPU 75 and the display unit 77. The CPU 75 powered by the power control section 722 starts the restart program 765 for the first time.

Turning to FIG. 6 which shows the content of the restart program 765, the CPU 75 is powered on. Then, the control is transferred to the start of the program. At the next step S61, the CPU 75 returns to the register group 75 tile content of the register group 75 saved in the register group storage area 761 immediately before transferring to the standby mode and then returns to the application program 763 immediately before transferring to the standby mode. As mentioned above, if any key 74-K on the keyboard is kept pressed for an interval of Ts×P seconds or more, the transfer condition to the run mode can be limited to the press of the special key 74-B.

Next, the description will be oriented to the operation of the power control unit if one key is continuously input for an interval of Ts×P seconds at the run mode.

In a case that the system stays at the run mode, any key 74-K on the keyboard is kept pressed for an interval of Ts×P seconds, the keyboard control unit 73 operates to store in the key code register 731 the key code data Qk formed by setting to "1" the key code and the key press data for the pressed key 74-K and sends out the keyboard interrupt signal onto the keyboard interrupt control line 79. The keyboard interrupt signal is transmitted to the one key input monitor section 723 of the power control unit 72 for starting the one key input monitor section 723. The one key input monitor section 723 performs the process of the steps S21 to S23. Since any key 74-K on the keyboard is kept pressed for an interval of Ts×P seconds, the loop of the steps S23 to S27 exits at the step S27. The control goes to the step S28. Since the current power mode is the run mode, at the steps S28 to S29, the control goes to the step S24. At the step S24, the standby interrupt signal is sent out to the standby interrupt signal line 80. By sending the standby interrupt signal onto the standby interrupt control line 80, a standby interrupt takes place in the CPU 75 in a manner to start the standby interrupt program 75-4.

Turning to FIG. 5 which shows the content of the standby interrupt program 764, the occurrence of the standby interrupt causes the operation to go to the start of the program. The standby interrupt program passes the control to the step S51. If, at the step S51, the CPU 75 is powered off and then on again, the content of the register group 751 needed for restarting the operation is stored in the register group storage area 761 for restarting the operation immediately before the standby interrupt takes place. The control goes to the step S52. At this step, the CPU 75 stores the power control data "0" in the power control register 7221 and then terminates its operation. Hence, the power control unit 72 powers off the power supply line 81 and then off the CPU 75 and the display unit 77. As mentioned above, if any key 74-K on the keyboard is kept pressed for an interval of Ts×P seconds at the run mode, the mode is automatically transferred to the standby mode.

In turn, the description will be oriented to how the power mode is transferred as referring to FIG. 15.

FIG. 15 shows how the power mode is transferred. As shown, a numeral 91 denotes the run mode. A numeral 92 denotes the standby mode A. A numeral 98 denotes the standby mode B. If the system stays at the standby mode A, the transfer condition to the run mode 91 is any key input of the keys 74-1 to N. If the system stays at the standby mode A, the transfer condition of the standby mode B is continuous input of one key. If the system stays at the standby mode B, the transfer condition to the run mode is an input of the special key 74-B. If the system stays at the run mode 91, the transfer condition to the standby mode A is an input of the standby key 74-A, no occurrence of a key input for an interval of Sto×T seconds or more, or one key input for an interval of Ts×P seconds or more.

Many widely different embodiments of the present invention may be constructed without departing from the spirit and scope of the present invention. It should be understood that the present invention is not limited to the specific embodiments described in the specification, except as defined in the appended claims.

What is claimed is:

1. An information processing system having a run mode at which said system is powered and a standby mode at which part of said system is powered, comprising:

an input means for inputting information including a keyboard with a plurality of keys;

a first detecting means for detecting a depression of one of said keys for a certain interval of time at said run mode;

a second detecting means for detecting a continuous depression of one of said keys for a predetermined interval of time;

a run mode transfer means for transferring said standby mode to said run mode by a depression of any one of said keys; and a standby mode transferring means for transferring said run mode to said standby mode, including a first transferring means for transferring said run mode to said standby mode by a depression of a predetermined one of said keys, a second transferring means for transferring said run mode to said standby mode in a case where said first detecting means detects no depression of one of said keys for said certain interval of time at said run mode, and a third transferring means for transferring said run mode to said standby mode in a case where said second detecting means detects said continuous depression of one of said keys for said predetermined interval of time at said run mode.

2. A system according to claim 1, further comprising:

a restricting means for restricting the condition of transferring said standby mode to said run mode to a depression of another predetermined key in a case where said second detecting means detects said continuous depression of one of said keys for said predetermined interval of time at said standby mode.

3. A system according to claim 1, wherein said first detecting means includes a standby timer for measuring a time period and being reset by a depression of one of said keys, and comparing means for comparing a time period measured by said standby timer with a standby timer with a predetermined timeout period.

4. A system according to claim 1, wherein said second detecting means includes a depression timer for measuring a time period of said continuous depression of said one of said keys, and comparing means for comparing a time period measured by said depression timer with a continuous depression time period.

5. A system according to claim 1, further comprising a determining means for determining that the current condition of said system is said run mode or said standby mode.

6. A system according to claim 1, wherein said standby mode transferring means includes a power control means for supplying power to said part of said system.

7. A system according to claim 1, wherein said run mode transferring means includes a power control means for supplying power to said system.

8. An information processing system, having a run mode at which said system is powered and a standby mode at which part of said system is powered, comprising:

an input means for inputting information, including a keyboard with a plurality of keys;

a first detecting means for detecting a depression of one of said keys for a certain interval of time at said run mode;

a second detecting means for detecting a continuous depression of one of said keys for a predetermined interval of time;

a run mode transferring means for transferring said standby mode to said run mode by a depression of one of said keys;

a standby mode transferring means for transferring said run mode to said standby mode, including a first transferring means for transferring said run mode to said standby mode by a depression of a predetermined one of said keys and a second transferring means for transferring said run mode to said standby mode in a case where first detecting means detects no depression of one of said keys for said certain interval of time at said run mode; and a restricting means for restricting the condition of transferring said standby mode to said run mode to a depression of a predetermined key in a case where said second detecting means detects said continuous depression of one of said keys for said predetermined interval of time at said standby mode.

* * * * *